Oct. 4, 1966     A. J. EGGERS, JR., ETAL     3,276,722
FLIGHT CRAFT
Filed Feb. 4, 1964     5 Sheets-Sheet 1
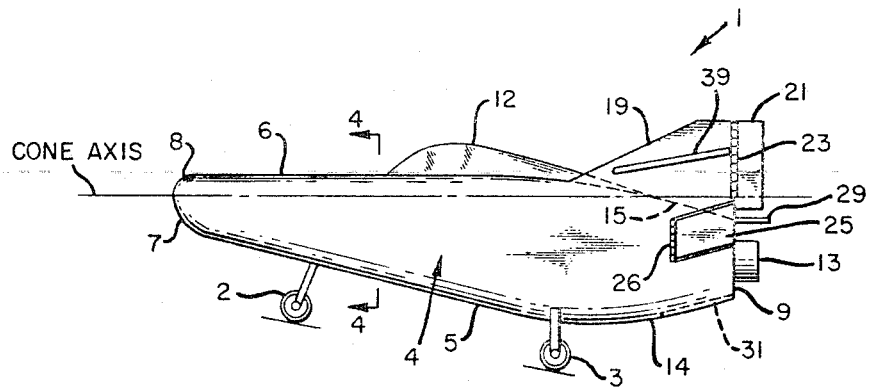
FIG-1
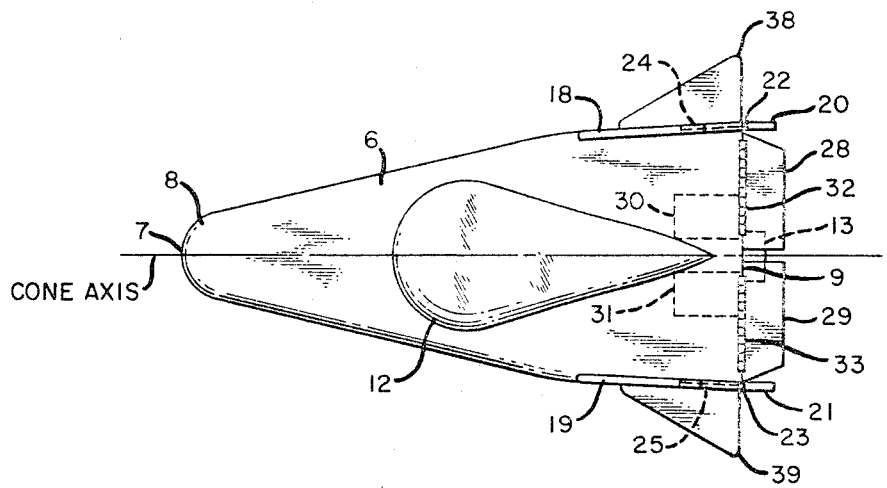
FIG-2
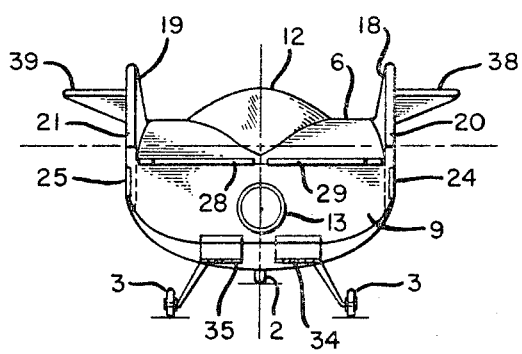
FIG-3
FIG-4
INVENTORS
ALFRED J. EGGERS, JR.
CLARENCE A. SYVERTSON
GEORGE G. EDWARDS
GEORGE C. KENYON
BY
ATTORNEY INVENTORS
ALFRED J. EGGERS, JR.
CLARENCE A. SYVERTSON
GEORGE G. EDWARDS
GEORGE C. KENYON
BY
ATTORNEY

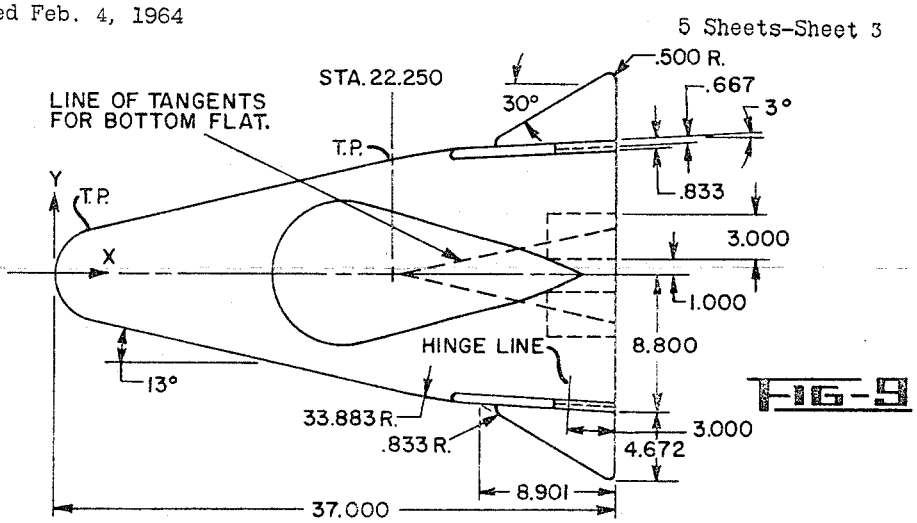
FIG-9
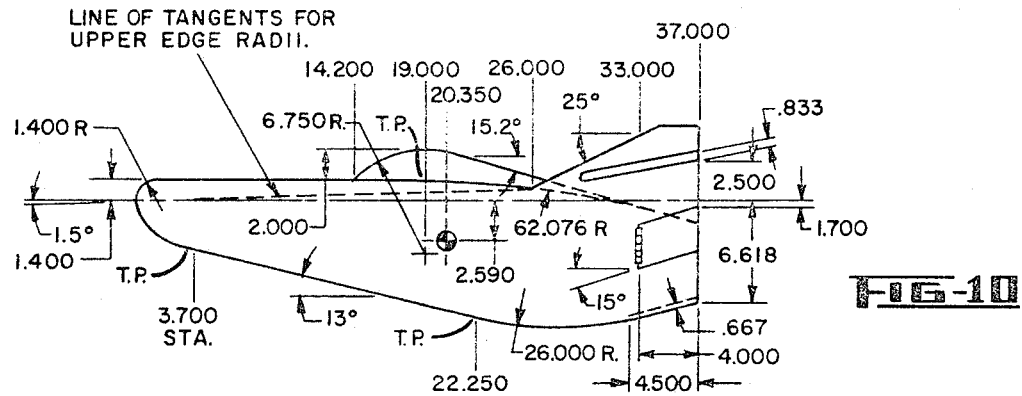
FIG-10
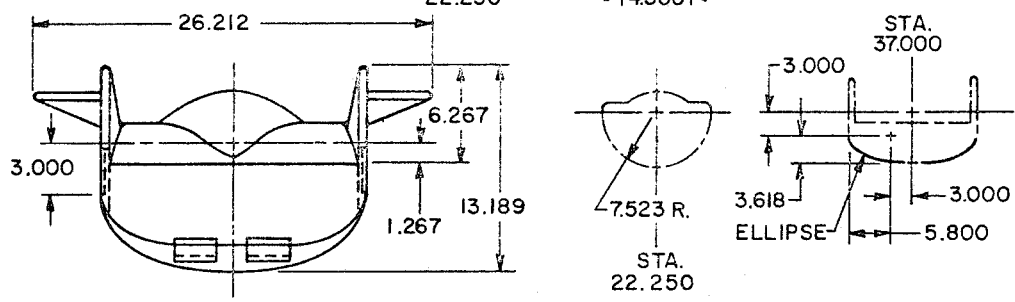
FIG-11   FIG-12   FIG-13
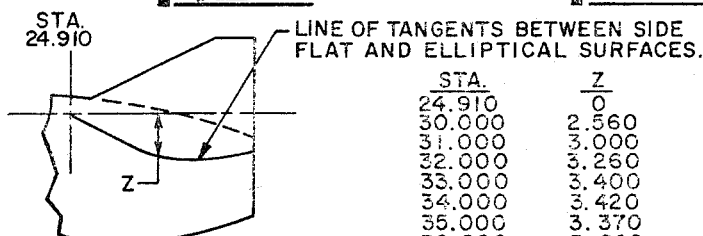
FIG-14
FIG-15
| STA. | Z |
|---|---|
| 24.910 | 0 |
| 30.000 | 2.560 |
| 31.000 | 3.000 |
| 32.000 | 3.260 |
| 33.000 | 3.400 |
| 34.000 | 3.420 |
| 35.000 | 3.370 |
| 36.000 | 3.260 |
| 37.000 | 3.000 |
*INVENTORS*
ALFRED J. EGGERS, JR.
CLARENCE A. SYVERTSON
GEORGE G. EDWARDS
GEORGE C. KENYON
BY
ATTORNEY Oct. 4, 1966   A. J. EGGERS, JR., ETAL   3,276,722
FLIGHT CRAFT Filed Feb. 4, 1964   5 Sheets-Sheet 4

INVENTORS
ALFRED J. EGGERS, JR.
CLARENCE A. SYVERTSON
GEORGE G. EDWARDS
GEORGE C. KENYON

BY
ATTORNEY

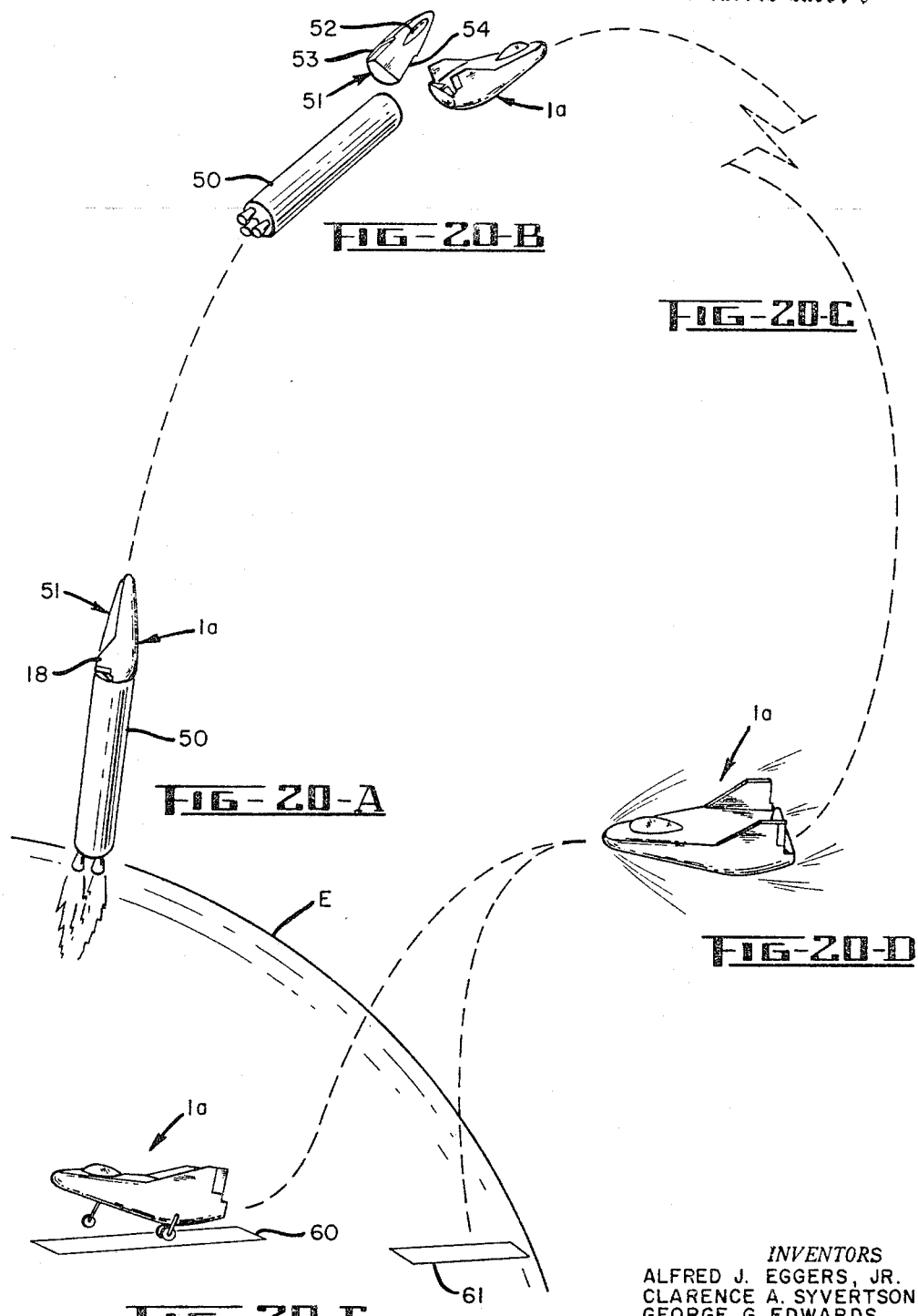

United States Patent Office 3,276,722
Patented Oct. 4, 1966

3,276,722
FLIGHT CRAFT
Alfred J. Eggers, Jr., Los Altos, Clarence A. Syvertson, Saratoga, George G. Edwards, Cupertino, and George C. Kenyon, Mountain View, Calif., assignors to the United States of America as represented by the Administrator of the National Aeronautics and Space Administration
Filed Feb. 4, 1964, Ser. No. 342,572
23 Claims. (Cl. 244—1)

The invention described herein may be manufactured and used by or for the Government of the United States of America for governmental purposes without the payment of any royalties thereon or therefor.

This invention relates to flight craft which are operable throughout an extremely wide speed range. More specifically the invention relates to a flight craft which is suitable for space flight, entry from space into an atmosphere, and atmospheric flight.

In the modern field of manned space flight, one of the present requirements is for an improved type of flight craft for housing flight personnel. Manned space flights made to date have been in capsule-type craft which have relatively little lateral maneuverability after re-entry into the earth's atmosphere. In addition, the capsules are incapable of controlled horizontal landing. Instead, the prior art capsules are required to be landed by parachute. The flexibility and safety of space flights can be tremendously increased if the pilot can maneuver and land the flight craft ofter re-entry much like a conventional aircraft.

Accordingly, it is an object of the present invention to provide a flight craft which, after re-entry, is laterally maneuverable over a substantial range, preferably on the order of 1000 miles to give the pilot a wide selection of landing locations, and even to the extent that for orbital flight a given landing field can be reached regardless of the particular numbered orbit selected for re-entry.

Another object of this invention is to provide a flight craft which can be landed horizontally on conventional landing fields.

Several proposals have been made for craft to accomplish the preceding purposes. For example, winged craft such as the "X–15" hypersonic research aircraft have been proposed, as well as adjustable wing craft such as the delta-winged X–20 "Dyna-Soar," and also wingless craft as the "lenticular" or disk-shaped type has been proposed. Each of the various proposed craft has certain characteristics which are very interesting for certain purposes. However, in the field of complete space missions, from launch to re-entry, there are many basic requirements to be considered in addition to the requirements of maneuverability and horizontal landing. Accordingly, the general purpose of the present invention is to consider a wide variety of requirements and provide a flight craft which presents an improved overall solution.

More specifically, an object of this invention is to provide a flight craft which can be easily mounted on a launching rocket and which will require a minimum need for additional controls on the rocket to compensate for the aerodynamic effect of the flight craft during the rocket flight.

Another object of this invention is to provide a flight craft having a high ratio of volume-to-surface area, and a shape which permits substantially all of its internal space to be conveniently usable for housing personnel and equipment, as distinguished from the hard to use shallow spaces within wings. In this way the size and weight of the craft is minimum for a given payload, and the amount of surface requiring protection from heat is also minimum.

An additional object of this invention is to provide a flight craft which, at a selected angle of attack, is a low-drag aerodynamic shape so that the deceleration force due to re-entry into the atmosphere will be well within comfortable limits. A related object is to provide a craft which is maneuverable by its own movable control surfaces to attain and maintain said low-drag angle of attack.

A further object of this invention is to provide a flight craft which is self-trimming at desirable angles of attack during atmospheric re-entry at hypersonic speeds and also at subsonic speed.

Another object of this invention is to provide a flight craft having a lift-over-drag ratio which is sufficiently high to give the shallow glide path necessary for the required maneuverability and which is sufficiently high to permit horizontal landing on conventional runways.

An additional object of this invention is to provide a flight craft which has acceptable heating characteristics during re-entry.

These and other objects and features of advantage are more fully explained in the following detailed description, wherein reference is made to the accompanying drawings, in which:

FIGURE 1 is a side view of a flight craft according to the invention;
FIGURE 2 is a top view of the flight craft of FIG. 1;
FIGURE 3 is a rear view of the flight craft of FIG. 1;
FIGURE 4 is a dot-dash outline of the cross section shape at line 4—4 of FIG. 1;
FIGURE 5 is a side view of the rear portion of the craft of FIG. 1 showing adjustment of the various controls;
FIGURE 6 is a top view of the rear portion of the craft of FIG. 1 showing adjustment of the various controls;
FIGURE 7 is a chart of wind tunnel results for the flight craft of FIG. 1 showing coefficient of lift $C_L$ plotted against coefficient of drag $C_D$ and against angle of attack $\alpha$, the latter being referenced to the cone axis designated in FIG. 1 (see the description of FIG. 8 for a discussion of the test parameters);
FIGURE 8 is a chart of wind tunnel test results for the flight craft of FIG. 1 showing coefficient of lift $C_L$ plotted against pitching moment coefficient $C_m$, lift-over-drag $L/D$ and base pressure coefficient $C_p$. The tests plotted in FIGS. 7 and 8 were made at a free stream speed of Mach 0.25 and a Reynolds number of $15 \times 10^6$, based on model length. All of the controls were at zero deflection except that the elevons (as hereinafter described) were set with the trailing edge 10° up with respect to a plane parallel to the cone axis. All of the coefficients referred to in FIGS. 7 and 8 have the standard National Aeronautics and Space Administration definitions, as found for example in the National Aeronautics and Space Administration Technical Memorandum No. X–571;

FIGURES 9, 10 and 11 are top, side and bottom views of a flight craft having exactly the same body shape as the flight craft in FIGS. 1–3. All surfaces extending rearwardly from the trailing end of the body have been omitted from FIGS. 9–11. The important difference between the two sets of figures is that in FIGS. 1, 2 and 3 the various parts and shapes are defined by reference numbers, whereas in FIGS. 9, 10 and 11 there are no reference numbers. Instead, FIGS. 9, 10 and 11 show the dimensions and instructions which completely describe a specific construction of the body shape of a flight craft according to the invention. The measurements given in FIGS. 9–11 and 12–15 are in dimensionless units based on the total body length of 37.000 units measured from nose to trailing end. The notations T.P. and R stand for tangent point and radius, respectively, and Sta. stands for Station;

FIGURES 12 and 13 are dot-dash outlines of the cross sectional shape at stations 22.250 and 37.000 respectively. The term station as used here and throughout the specification and claims refers to the distance from the nose in dimensionless units and not to a percentage of the length;

FIGURE 14 is a side view of the rear portion of the craft with movable controls removed for clarity and showing the line of tangents between the flat and eliptical surfaces;

FIGURE 15 is a chart defining the dimensions which give the tangent line in FIG. 14;

Figure 16:
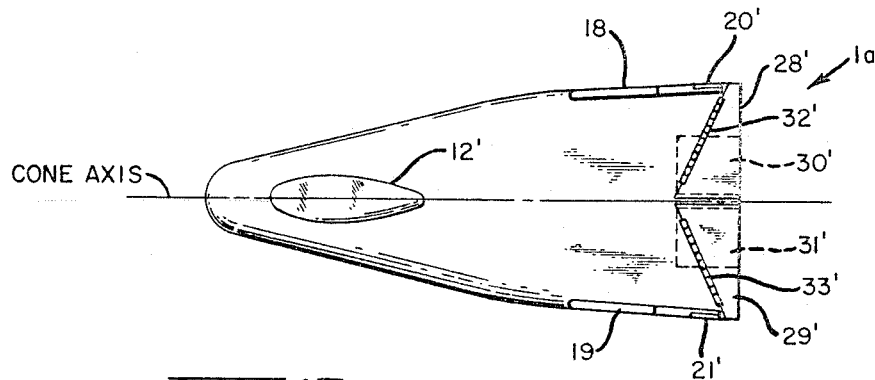
FIGURE 16 is a top view of a modified flight craft according to the invention.
Figures 18, 19:
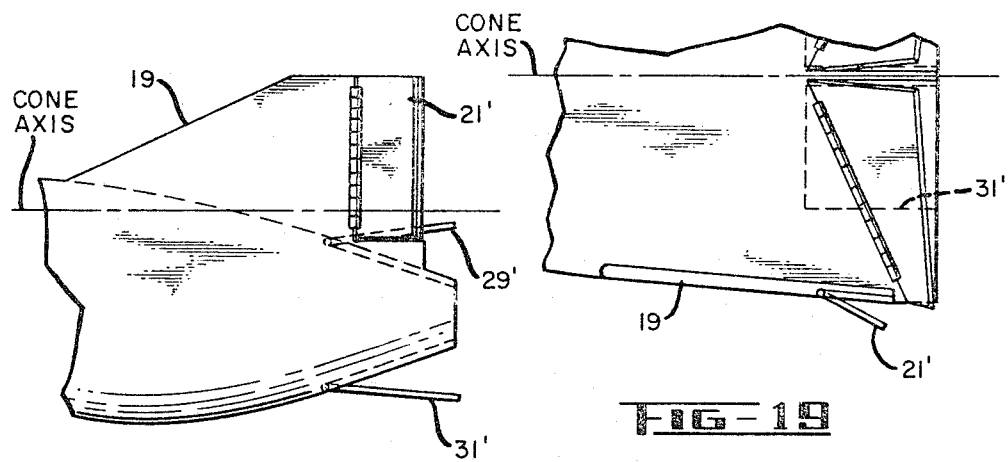
FIGURE 18 is an enlarged side view of the rear portion of the craft of FIG. 16 showing adjustment of the various controls.

FIGURE 19 is an enlarged top view of the rear portion of the craft of FIG. 16 showing adjustment of the various controls; and FIGURES 20A–20E represent a voyage cycle for a flight craft according to the invention, from launch FIG. 20A, to separation from the rocket FIG. 20B, through the mission whether it be deep space or orbital FIG. 20C, to re-entry into the earth's atmosphere FIG. 20D, and finally to touch-down on a landing strip, FIG. 20E.

Referring to the drawings in more detail, FIGS. 1–5 show a flight craft 1 constructed according to the invention. The craft is preferably provided with a tricycle landing gear consisting of a forward wheel 2 and two rear wheels 3, or in the alternative the rear wheels can be replaced by skids. The landing gear must, of course, be retractable for high speed flight and conventional retracting mechanism, not shown, is provided for that purpose.

Flight craft 1 is basically a wingless lifting body, shaped to achieve the required lift, and provided with movable surfaces to achieve the required control. The shape of the lifting body can be described in general terms as a half-cone. More specifically, the forward lower portion 4 of the craft is a portion of a cone. The optimum cone half angle is 13°. In other words, the angle between surface 5 of the cone and the cone axis is 13°. The forward upper portion of the body is a flat surface 6 parallel to the cone axis. The forward or leading end of the body is blunted rather than a sharp-pointed continuation of surface 5. The nose is blunted primarily to provide good heat characteristics at hypersonic speeds. The nose has one shape for the portion 7 below the cone axis and one shape for the portion 8 above the cone axis. Specific optimum shapes for portions 7 and 8 will be defined hereinafter.

The top of the craft is provided with a transparent canopy 12 which can be used by the pilot for visual flight control. The flight craft can either carry its own propulsion system for powered flight or it can operate entirely as a glider in the atmosphere. Flight craft 1 is shown equipped with a rocket motor having an exhaust tube 13.

It will be noted that the shape of the rear portion of the flight craft departs from the exact half cone and flat parallel top. Insofar as hypersonic speeds are concerned, it might be satisfactory to retain the half cone shape throughout the length. However, in order to obtain the required lift/drag ratio and trim requirements for low speed flight and landing, the rear portion of the flight craft is given what is called a boattail shape. More specifically, the bottom surface is curved upwardly along the portion 14 and the upper surface is curved downwardly along the portion 15. Specific optimum shapes for portions 14 and 15 will be defined hereinafter. The side conical surface outline as viewed from the top in FIG. 2 is also discontinued at the rear portion of the craft and the rear sides are made straight and vertical as will be hereinafter described in more detail.

Figures 5, 6:
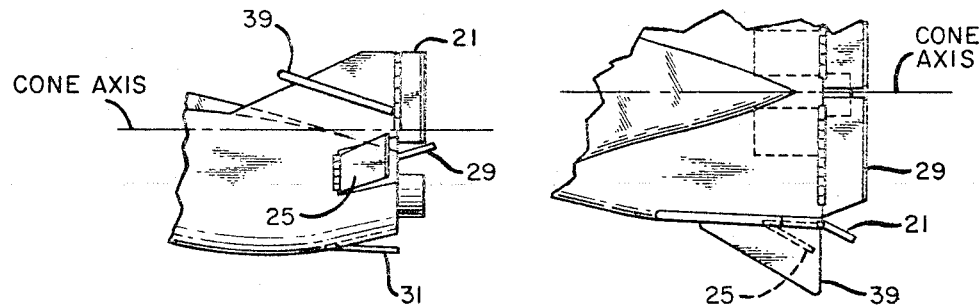

In order to provide the necessary directional stability, the flight craft is provided with vertical fins 18 and 19. Maneuverability is provided by a number of movable control surfaces. More specifically, yaw control is provided by rudders 20 and 21 pivotally attached to the fins 18 and 19 by hinges 22 and 23. Additional yaw control and speed braking is provided by flaps 24 and 25 which are recessed flush in the sides and moves about the hinges 26. Pitch and roll control is provided by upper or trailing edge flaps 28 and 29 and by bottom flaps 30 and 31. The upper flaps are connected to the top rear edge of the craft by hinges 32 and 33. The bottom flaps are recessed flush into the bottom which is flattened off in the area where the flaps are located. The bottom flaps are connected to the body by hinges 34 and 35. The top flaps are particularly effective at subsonic speeds and the bottom flaps are particularly effective at hypersonic speeds. Additional pitch and roll control is provided by elevons 38 and 39 which are each pivotally connected to the adjacent stabilizing fins for adjustment about a horizontal pivot axis at the center of the elevon. FIGS. 5 and 6 show the various controls moved to other positions of adjustment than in FIGS. 1–3 in order to clarify their operation. It will be understood by those skilled in the art that each pair of control surfaces on opposite sides of the craft is provided with conventional linkage for moving the control surfaces of each pair in unison or selectively.

Figure 7:
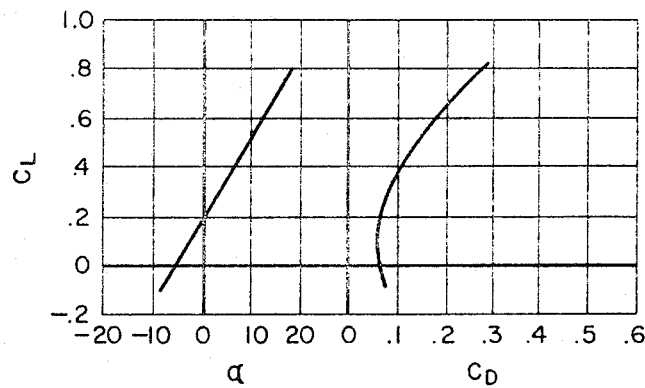
Figure 8:
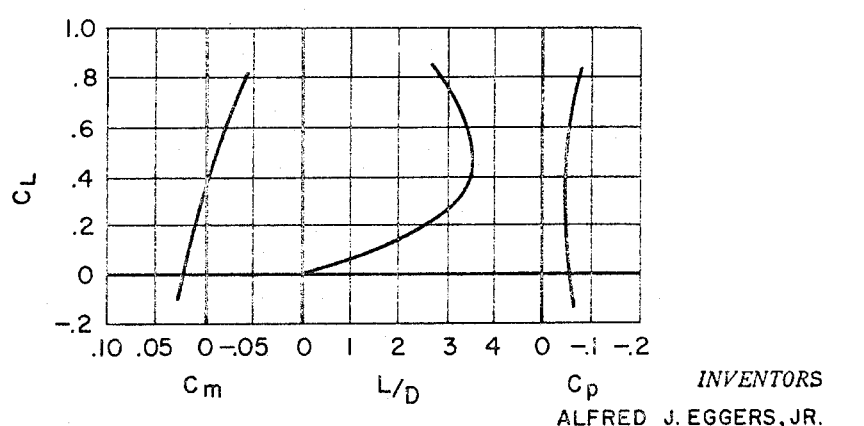

FIGURES 7 and 8 show actual wind tunnel test results for a model having the shape shown in FIGS. 1–6. The test parameters are given in the summary description of FIGS. 7 and 8 at the beginning of this detailed description. As pointed out in said summary description, the specific values plotted in FIGS. 7 and 8 are for the condition of zero deflection of all of the controls except the elevons. In this connection it is pointed out that zero deflection is measured in the following manner. Zero deflection for the top flaps 28 and 29 is with the flaps tangent to the upper surface at the trailing end of the body. Zero deflection for the bottom flaps and the yaw flaps is with the flaps in their flush recessed positions shown in FIGS. 1–3. Zero deflection for the rudders is, of course, in line with their respective stabilizers, although in actuality the rudders were not employed on the test model and would have no measurable effect on the test results in FIGS. 7 and 8. The moment center for the tests was located at 55 percent of the length from the nose and 7 percent of the length below the cone axis. The flight characteristics shown in FIGS. 7 and 8 are representative of a large series of tests covering a variety of speeds and positions of control surfaces, as set forth in the National Aeronautics and Space Administration Technical Memorandum No. X–571.

As will be understood by those skilled in the art, the plots in FIGS. 7 and 8 show that the flight craft 1 has the desirable characteristics of nearly linear curves of lift coefficient and pitching moment up to lift coefficients approaching unity; longitudinal stability; a maximum trimmed lift-over-drag ratio of between 3 and 4; and capability of being trimmed through the lift coefficient range of interest. In addition to model tests in a wind tunnel, the design of flight craft 1 has been tested as a full scale prototype, including rudders 20, 21. Many actual manned flights with the prototype have proven it to be maneuverable and capable of safe horizontal landing even in a no-power glide. In order to best describe the complete optimum body shape which has proven to be successful in both scale model and actual full scale tests, FIGS. 9–15 are included. These figures give all the dimensions and instructions necessary to reproduce the successful body shape.

For example, the optimum shape for the nose portion 7 is given by the line equation $$\frac{Y}{l} = .38618\sqrt{\frac{X}{l}} - .1239\frac{X}{l} - 4.08407\left(\frac{X}{l}\right)^2 + 18.70215\left(\frac{X}{l}\right)^3$$

wherein X is measured along the cone axis, Y is measured at right angles thereto, and $l$ is 37 units. The line which is thus defined is rotated about the cone axis to give the shape of nose portion 7. The optimum shape for the nose portion 8 is a section of a circle having a radius of 1.40, drawn tangent to line 7 and the upper surface 6.

The bottom straight conical surface 5 stops at about station 22.00 (as defined in the description of FIGS. 12–15) and is met with a tangent curve of radius 26.00. The top flat surface 6 stops at about station 19.00 and is met with a tangent curve of radius of about 62.00. The side conical surface outline as viewed from the top in FIG. 2 is also discontinued at about station 22.00, and the rear sides are made straight and vertical. The sides are at an optimum angle of 3° to the cone axis and are faired into the straight half-cone surface and the curved bottom.

FIGURES 16–19 show a slightly modified flight craft 1a which has been shown by model tests to have substantially the same characteristics as flight craft 1. The shape of flight craft 1a is exactly the same as flight craft 1 back to station 37.00, and the same reference numerals are used to define exactly the same parts. Primed numerals will be used to define modified parts. The difference in body shape between crafts 1 and 1a is that craft 1a is made 10.8 percent longer than craft 1 by straight line extensions of the bottom and top surfaces rearwardly to a new and smaller trailing end 9′. This extended length added sufficient lift that the lifting effect of the elevons 38, 39 is not necessary. Accordingly, flight craft 1a does not include even a modification of elevons 38, 39. The yaw flaps 24 and 25 have also been omitted from flight craft 1a. In addition, the rudders 20 and 21 have been replaced by stationary rearward extensions of the vertical fins 18 and 19 with side flaps or half rudders 20′ and 21′ recessed therein. The bottom tail flaps 30′ and 31′ are slightly larger for craft 1a. Upper pitch and roll flaps 28′ and 29′ are recessed in the top of the upper rear surface of the body instead of extending rearwardly from the end of the body as do flaps 28 and 29. In addition, flaps 28′ and 29′ are attached by hinges 32′ and 33′ which are each set at an angle of 65° to the cone axis rather than normal thereto. The canopy 12′ is moved forward for better visibility for landing and the wheels 2′ and 3′ are positioned slightly different to accommodate the greater length of craft 1a.

Many of the control details are interchangeable between crafts 1 and 1a for specific uses of the vehicles, and certain of the controls have particularly desirable features for certain purpoes. For example, the elevons 38 and 39 could be added to craft 1a and would be beneficial in providing additional control and lift. However, the elevons are particularly subject to heating problems at hypersonic speeds, such as encountered upon return from a deep space mission as compared to return from an orbital mission. Also, the recessed flaps 20′ and 21′ are interchangeable with the rudders 20 and 21. The advantage of flaps 20′ and 21′ over the conventional rudders 20 and 21 is that adjustment of the rudders causes a change in air velocity through the channel between vertical fins 18 and 19 which changes the amount of lift on the rear portion of the body. If desired, the yaw flaps 24 and 25 of craft 1 can be added to craft 1a for additional yaw control and aerodynamic braking. The upper flaps 28, 29 are interchangeable with the flaps 28′ and 29′, although the latter have two advantages for certain purposes. The fact that flaps 28′ and 29′ do not extend rearwardly beyond the flat trailing end of the craft makes it easier to mount the craft on a rocket. Also, the skewed hinge angle of flaps 28′ and 29′ prevents a tendency toward reverse yaw which occurs when top flaps hinged normal to the cone axis are adjusted for roll.

Figure 17:
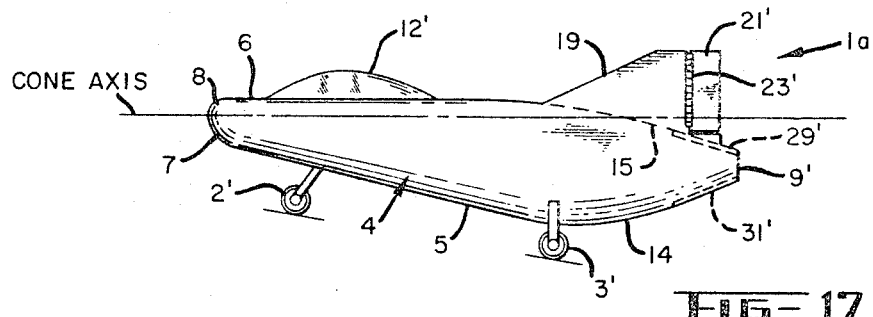
FIGURE 17 is a side view of the flight craft of FIG. 16.

FIGS. 20A–20E provide a schematic representation of a complete space flight. FIG. 20A shows the flight craft 1a being propelled upwardly from the earth E by a rocket 50. It should be noted that the flat trailing end of the flight craft simplifies mounting on the rocket. Also the basic half cone shape and absence of wings makes it a simple matter to provide a jettisonable matching shape 51 which transforms the craft into a substantially full-cone nose for the rocket. The shape 51 is simply the shape which when placed on the top of the craft as shown in FIG. 17 forms a composite shape which is symmetrical about the cone axis. Accordingly, shape 51 is recessed as at 52 to accommodate the canopy of the flight craft, and recessed at 53 and 54 to accommodate the stabilizers. If desired, shape 51 can be designed to carry fuel or other supplies or equipment.

After the flight craft has been propelled beyond the atmosphere to a predetermined position, the flight craft is separated from the rocket by use of a conventional break-away arrangement, and in like manner the shape 51 is jettisoned. The break-away action is represented by FIG. 20B. The flight craft then goes on to perform its space mission as indicated by the jagged line denoted as FIG. 20C. The mission may involve travel into deep space or it may simply be an orbital flight. The power required for space flight and return to the earth's atmosphere can be carried by the flight craft or by a secondary motor unit (not shown) which travels with the flight craft and is not jettisoned until return to the atmosphere.

When the space mission has been completed the flight craft re-enters the earth's atmosphere as indicated by FIG. 20D. The blunt nose and basic half-cone shape of the flight craft make it possible to handle the heating caused by the hypersonic re-entry speeds. As will be understood by those skilled in the art, the flight craft of the invention is provided with conventional wall construction and materials to protect the interior from heat. The heating problem can be materially lessened according to the invention if the initial, highest speed, portion of the re-entry flight is made at low angle of attack. This, of course, would reduce the lateral range if maintained. However, the velocity decreases rapidly, and ample range is possible by pitching the craft to high angle of attack for high lift-over-drag as soon as the velocity decreases to the point where the heat generated at high angle of attack is tolerable. The flight craft is specifically designed and required to be controllable at hypersonic speeds over a wide range of angle of attack and, more specifically, to be self trimming at a selected angle of attack at hypersonic speeds. In addition to requiring good control and relatively high lift-over-drag at hypersonic speed, the flight craft must and does have high lift-over-drag and good controllability at subsonic speeds. Thus, the craft must be and is able to maneuver to a desired landing strip such as strip 60, or selectively strip 61, and then land horizontally, all as indicated in FIG. 20E.

Although preferred embodiments of the present invention are shown and described herein, it is to be understood that modifications may be made therein without departing from the spirit and scope of the invention as set forth in the appended claims. For example, the flight craft according to the invention has been described herein solely for use in connection with space flight, but it should be understood that it is also capable of use entirely within the earth's atmosphere as a craft capable of an extreme range of velocities. In case of such usage, the type of propulsion unit 13 would be selected from among conventional units, as determined by desired speed, range, payload and other such characteristics.

Having thus described the invention, what is claimed as new and desired to be secured by Letters Patent is:

1. A flight craft comprising a forward section with a conically shaped lower portion converging toward a blunt nose, an upper surface which is flatter than said lower portion to provide a lifting shape, a vertical fin on each side of the craft adjacent the trailing end of the craft, said conical shape terminating short of the trailing end of the craft, and the lower portion of the craft curving upwardly and inwardly from said termination of the conical shape to said trailing end.

2. A flight craft comprising a forward section with a conically-shaped lower portion converging toward a blunt nose, an upper surface which is flatter than said lower portion to provide a lifting shape, a flat trailing end substantially normal to the center-line of said conical shape, said conical shape terminating aft of the craft midlength nearer said midlength than said trailing end, the lower portion of the craft sloping upwardly from said termination of the conical shape to said trailing end, and a pair of vertical fins extending upwardly at each side of the craft adjacent said trailing end.

3. A flight craft as claimed in claim 2 in which said conical shape has a substantially 13° half-cone angle.

4. A flight craft as claimed in claim 2 further comprising a control flap mounted on the exterior of each of said vertical fins for movement about a substantially vertical pivot axis, and two separate control flaps mounted on said upper surface adjacent said trailing edge for movement about substantially horizontal pivot axes.

5. A flight craft comprising a forward section with a tapered lower portion which is symmetrical on each side of the craft and converges toward a blunt nose, an upper surface which is flatter than said lower portion to provide a lifting shape, a flat trailing end, said tapered portion terminating aft of the craft midlength nearer said midlength than said trailing end, the lower portion of the craft sloping upwardly from said termination of the tapered portion to said trailing end, and a pair of vertical fins extending upwardly at each side of the craft adjacent said trailing end.

6. A flight craft as claimed in claim 5 further comprising a canopy on said upper surface.

7. A flight craft as claimed in claim 5 in which the rearward portion of said upper surface slopes downwardly from the craft midportion to said trailing end.

8. A flight craft comprising a forward section with a conically-shaped lower portion converging toward a blunt nose, an upper surface which is flatter than said lower portion to provide a lifting shape, said conical shape terminating aft of the craft 50%-station nearer said 50%-station than the trailing end of said craft, the lower portion of the craft curving upwardly from said termination of the conical shape to the trailing end of the craft, and a pair of vertical fins extending upwardly at each side of the craft adjacent said trailing end.

9. A flight craft as claimed in claim 8 in which the lower portion of said nose is formed by a line defined as $$\frac{Y}{l} = .38618\sqrt{\frac{X}{l}} - .1239\frac{X}{l} - 4.08407\left(\frac{X}{l}\right)^2 + 18.70215\left(\frac{X}{l}\right)^3$$

where the X axis is the center line of said conical shape and Y is measured at right angles thereto and $l$ is 37.00 units, said defined line being revolved about said center line below the horizontal plane through said center line, and the upper portion of said nose is formed by curves of radii 1.400 units connecting said upper surface and said lower portion of said nose.

10. A flight craft comprising a forward section with a conically-shaped lower portion converging toward a blunt nose, an upper surface which is flatter than said lower portion to provide a lifting shape, a pair of vertical fins extending upwardly at each side of the craft adjacent the trailing end of the craft, and a pair of control flaps pivotally connected to said craft adjacent the junction of said upper surface and said trailing end, the pivotal connection of each of said flaps comprising a substantially horizontal pivot axis.

11. A flight craft as claimed in claim 10 in which said flaps extend rearwardly from said trailing end of the craft.

12. A flight craft as claimed in claim 10 in which said pivot axis for each of said flaps is swept back.

13. A flight craft as claimed in claim 12 in which each said pivot axis is swept back at an angle of substantially 25° measured from a line normal to the longitudinal axis of the craft.

14. A flight craft comprising a forward section with a conically-shaped lower portion converging toward a blunt nose, an upper surface which is flatter than said lower portion to provide a lifting shape, said conical shape terminating aft of the craft midlength nearer said midlength than the trailing end of said craft, the lower portion of the craft sloping upwardly from said termination of the conical shape to the trailing end of the craft, a pair of vertical fins extending upwardly at each side of the craft adjacent said trailing end, said upper surface having a forward portion which is substantially parallel to the axis of said conical lower portion, and said upper surface having a rearward portion which slopes downwardly from said parallel portion at the craft midportion to said trailing end.

15. A flight craft as claimed in claim 14 in which said downwardly sloping rearward portion of the upper surface crosses the cone-axis of said conical portion.

16. A flight craft as claimed in claim 14 in which the craft is 37 units long and said trailing end is at station 37, said conical lower portion terminates substantially at station 22 and said parallel upper surface terminates substantially at station 19, said sloping lower portion comprises a curve having a radius of substantially 26 units and said sloping upper surface portion comprises a curve having a radius of substantially 62 units, said conical lower portion has a half-cone angle of substantially 13°, and said parallel upper surface is substantially 1.4 units above the axis of said half-cone.

17. A flight craft as claimed in claim 16 in which the trailing end of said craft is a flat surface normal to the axis of said half-cone.

18. A flight craft comprising a forward section with a conically-shaped lower portion converging toward a blunt nose, an upper surface which is flatter than said lower portion to provide a lifting shape, said conical shape terminating aft of the craft midlength nearer said midlength than the trailing end of said craft, the lower portion of the craft sloping upwardly from said termination of the conical shape to the trailing end of the craft, a pair of vertical fins extending upwardly at each side of the craft adjacent said trailing end, said upper surface having a forward portion which is substantially parallel to the axis of said conical lower portion and said upper surface having a rearward portion which slopes downwardly from said parallel portion at the craft midportion to said trailing end, a control flap mounted adjacent the trailing end of each of said fins for pivotal movement about a substantially vertical pivot axis, and a pair of control flaps mounted adjacent the trailing end of said craft for pivotal movement about substantially horizontal pivot axes.

19. A flight craft as claimed in claim 18 further comprising an elevon pivotally mounted on the outer surface of each of said fins.

20. A flight craft as claimed in claim 18 further comprising a yaw flap pivotally mounted on each side of the craft adjacent said trailing end.

21. A flight craft as claimed in claim 18 in which said pair of control flaps is located adjacent the top of said trailing end, and further comprising a pair of control flaps mounted adjacent the bottom of said trailing end for pivotal movement about substantially horizontal pivot axes.

22. A flight craft as claimed in claim 21 further comprising an elevon pivotally mounted on the outer surface of each of said fins, and a yaw flap pivotally mounted on each side of the craft adjacent said trailing end.

23. A re-entry vehicle comprising a forward section with a conically-shaped lower portion converging toward a blunt nose, an upper surface which is flatter than said lower portion to provide a lifting shape, said conical shape terminating aft of the craft midlength nearer said midlength than the trailing end of said craft, the lower portion of the craft sloping upwardly from said termination of the conical shape to the trailing end of the craft, a pair of vertical fins extending upwardly at each side of the craft adjacent said trailing end, said upper surface having a forward portion which is substantially parallel to the axis of said conical lower portion and said upper surface having a rearward portion which slopes downwardly from said parallel portion at the craft midportion to said trailing end, a control flap mounted adjacent the trailing end of each of said fins for pivotal movement about a substantially vertical pivot axis, and a pair of control flaps mounted adjacent the trailing end of said craft for pivotal movement about substantially horizontal pivot axes, the lifting characteristics of said lifting shape and the control characteristics of said control flaps being sufficient to provide a lateral maneuverability for said craft of substantially 1000 miles measured from re-entry into the earth's atmosphere to touchdown.

References Cited by the Examiner

UNITED STATES PATENTS

| | | | |
|---|---|---|---|
| 2,763,447 | 9/1956 | Carrau | 244—2 |
| 3,118,636 | 1/1964 | Kantrowitz | 244—1 |
| 3,132,825 | 5/1964 | Postle | 244—1 |
| 3,147,936 | 9/1964 | Mercille | 244—2 |

OTHER REFERENCES

Flight International 14, March 1963, vol. 83, No. 2818, pp. 380, 381.

FERGUS S. MIDDLETON, *Primary Examiner.*

G. P. EDGELL, *Assistant Examiner.*